(12) United States Patent
Myers et al.

(10) Patent No.: US 11,145,043 B2
(45) Date of Patent: Oct. 12, 2021

(54) USING UNMANNED AERIAL VEHICLES TO INSPECT AUTONOMOUS VEHICLES

(71) Applicant: Ford Motor Company, Dearborn, MI (US)

(72) Inventors: Scott Vincent Myers, Dearborn, MI (US); Mark Crawford, Dearborn, MI (US); Harpreetsingh Banvait, Dearborn, MI (US); Alexandru Mihai Gurghian, Dearborn, MI (US); Nikhil Nagraj Rao, Dearborn, MI (US); Alexandro Walsh, Dearborn, MI (US); Lisa Scaria, Dearborn, MI (US)

(73) Assignee: Ford Motor Company, Dearborn, MI (US)

(*) Notice: Subject to any disclaimer, the term of this patent is extended or adjusted under 35 U.S.C. 154(b) by 343 days.

(21) Appl. No.: 16/342,761

(22) PCT Filed: Oct. 24, 2016

(86) PCT No.: PCT/US2016/058467
§ 371 (c)(1),
(2) Date: Apr. 17, 2019

(87) PCT Pub. No.: WO2018/080425
PCT Pub. Date: May 3, 2018

(65) Prior Publication Data
US 2019/0266715 A1    Aug. 29, 2019

(51) Int. Cl.
*G06T 7/00* (2017.01)
*B64C 39/02* (2006.01)
(Continued)

(52) U.S. Cl.
CPC .......... *G06T 7/0002* (2013.01); *B64C 39/024* (2013.01); *B64C 39/028* (2013.01);
(Continued)

(58) Field of Classification Search
CPC .................................................. G06T 7/0002
See application file for complete search history.

(56) References Cited

U.S. PATENT DOCUMENTS 9,129,355 B1\* 9/2015 Harvey .................... G06K 9/52
2015/0210388 A1\* 7/2015 Criado ................... H04N 7/185
701/3
(Continued)

*Primary Examiner* — Alex C Dunn
(74) *Attorney, Agent, or Firm* — Brandon Hicks; Eversheds Sutherland (US) LLP

(57) ABSTRACT

The present invention extends to methods, systems, and computer program products for using Unmanned Aerial Vehicles (UAVs) to inspect autonomous vehicles. An autonomous vehicle carries a UAV (or "drone") in a protected area, for example, in a glove compartment, trunk, etc. Between rides, the UAV can be deployed to inspect the autonomous vehicle. Images from the UAV can be sent to other components for image analysis. When an inspection is completed, the UAV can return to the protected area. The UAV can inspect both the interior and exterior of an autonomous vehicle. When an inspection is passed, the autonomous vehicle can begin a new ride. When an inspection is failed, the autonomous vehicle can report for repairs or summon a tow vehicle.

19 Claims, 6 Drawing Sheets

(51) Int. Cl.
*B64F 1/22* (2006.01)
*G05B 13/02* (2006.01)
*G05D 1/00* (2006.01)
*G06N 3/04* (2006.01)
*G06Q 10/00* (2012.01)
*G07B 15/00* (2011.01)
*G07C 5/08* (2006.01)
*H04N 7/18* (2006.01)
*H04N 5/232* (2006.01)
*G06Q 10/08* (2012.01)
*H04N 5/247* (2006.01)

(52) U.S. Cl.
CPC ............ *B64F 1/222* (2013.01); *G05B 13/027* (2013.01); *G05D 1/0094* (2013.01); *G06N 3/04* (2013.01); *G06Q 10/20* (2013.01); *G07B 15/00* (2013.01); *G07C 5/08* (2013.01); *G07C 5/0808* (2013.01); *H04N 5/23206* (2013.01); *H04N 7/18* (2013.01); *H04N 7/185* (2013.01); *B64C 2201/123* (2013.01); *G06Q 10/083* (2013.01); *G06T 2207/10032* (2013.01); *G06T 2207/20084* (2013.01); *G06T 2207/30252* (2013.01); *G06T 2207/30268* (2013.01); *G07C 2205/02* (2013.01); *H04N 5/247* (2013.01)

(56) References Cited

U.S. PATENT DOCUMENTS

| | | | |
|---|---|---|---|
| 2015/0302669 A1* | 10/2015 | Gonnsen | B64F 5/60 701/23 |
| 2016/0016663 A1* | 1/2016 | Stanek | G05D 1/0094 701/3 |
| 2017/0080900 A1* | 3/2017 | Huennekens | G05D 1/0088 |
| 2017/0140603 A1* | 5/2017 | Ricci | H02J 7/35 |
| 2017/0355459 A1* | 12/2017 | Erickson | B64F 5/40 |
| 2018/0039838 A1* | 2/2018 | Chan | G08G 5/0043 |
| 2018/0040171 A1* | 2/2018 | Kundu | G07C 5/0808 |
| 2018/0082379 A1* | 3/2018 | Kelsh | G06Q 40/08 |
| 2018/0107210 A1* | 4/2018 | Harnett | B64D 1/02 |
| 2018/0170540 A1* | 6/2018 | Claybrough | G05D 1/0094 |

* cited by examiner

USING UNMANNED AERIAL VEHICLES TO INSPECT AUTONOMOUS VEHICLES

CROSS-REFERENCE TO RELATED APPLICATIONS

Not applicable.

BACKGROUND

1. Field of the Invention

This invention relates generally to the field of vehicle inspection, and, more particularly, to using Unmanned Aerial Vehicles (UAVs) to inspect autonomous vehicles.

2. Related Art

Autonomous vehicles have no driver. Thus, when an autonomous vehicle is used to provide fare-based rides for $3^{rd}$ parties, it can be difficult to inspect the autonomous vehicle for cleanliness, maintenance issues, etc., between rides. Cameras can be mounted on an autonomous vehicle to inspect some areas of the autonomous vehicle between rides. However, over time, camera lenses can be damaged or covered with dirt limiting their usefulness. Dirt and grime is a significant concern for externally mounted cameras, especially in locations that are prone inclement weather. For example, it can be difficult to keep undercarriage cameras clean from grime and snow in locations that experience winter weather.

BRIEF DESCRIPTION OF THE DRAWINGS

The specific features, aspects and advantages of the present invention will become better understood with regard to the following description and accompanying drawings where.

DETAILED DESCRIPTION

Figure 1:
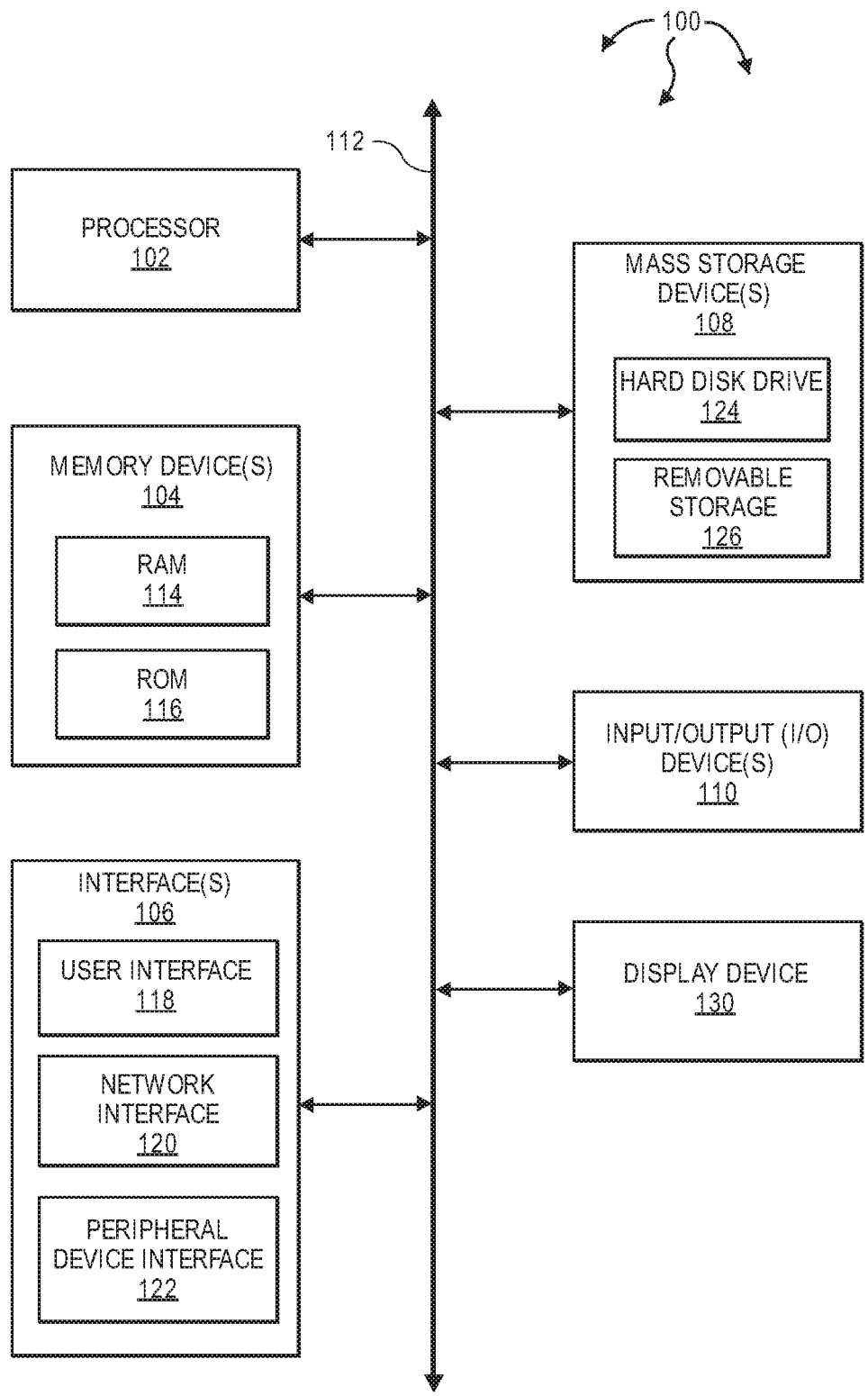
FIG. 1 illustrates an example block diagram of a computing device.

The present invention extends to methods, systems, and computer program products for using Unmanned Aerial Vehicles (UAVs) to inspect autonomous vehicles.

A Transportation as a Service (TaaS) fleet includes a one or more autonomous vehicles. Each of the one or more autonomous vehicles can provide fare-based rides to $3^{rd}$ parties. Each of the one or more autonomous vehicles carries a UAV (or "drone") in a protected area, for example, in a glove compartment, in a trunk, etc. Between rides the vehicle can deploy the UAV to inspect the vehicle. During inspection, the UAV remains electronically tethered to the vehicle. When an inspection is completed, the UAV can return to the protected area.

During an inspection, the UAV can inspect both the interior and exterior of an autonomous vehicle. The UAV can inspect the interior of an autonomous vehicle for cleanliness and polish. The UAV can inspect the exterior of an autonomous vehicle for fluid leaks, tire damage, body damage, brake pad integrity, to ensure that lights are working, to ensure that turn signals are working, etc.

The UAV's flight path can be pre-programmed into the UAV. To perform an inspection, the UAV follows the flight path stopping at designated locations to take images of specific parts of the vehicle. A UAV can fly around and under an autonomous vehicle during an exterior inspection. A UAV can also land on the ground and have an autonomous vehicle drive by and/or over the top of the UAV during an exterior inspection.

During an inspection, a UAV can send still images and/or video to the autonomous vehicle. The autonomous vehicle can in turn forward the still images and/or video to cloud computing resources for analysis. In one aspect, still images and/or video are sent to a neural network that runs on the cloud computing resources. The neural network analyzes the still images and/or video for anomalies, such as, for example, puddles of fluid, reduced tire tread, tire sidewall damage, disk brake pad wear, etc. If certain anomalies are detected, the inspection fails.

When an inspection is passed, the autonomous vehicle can begin a new ride. When an inspection is failed, the autonomous vehicle contacts a dispatch location requesting a replacement autonomous vehicle. Additionally, depending on the detected anomaly or anomalies causing the failed inspection, the autonomous vehicle can autonomously return to a repair facility or electronically request a tow vehicle.

The protected area can include a docking station for the UAV. The docking station can be similar to an electronic vehicle's (EV's) charge port, the gasoline inlet port, or a cavity within the trunk. Any vehicle cavity with a door that opens and closes automatically can be used.

The docking station can include a landing pad, a plurality of permanent hooks, one or more solenoid pins (or electromagnets), and components for wireless power transfer (WPT) via inductive coupling. The plurality of permanent hooks can be used to anchor the UAV in multiple directions, such as, for example, forward, back, and to the right. The solenoid pins can be used to anchor the UAV in another direction, such has, for example, to the left. The WPT components can be used to charge the UAV's batteries between inspections.

In one aspect, the solenoid pins are normally closed (anchored) so the solenoids draw vehicle power when the UAV is performing its inspection. Having the solenoid pins normally closed balances the need for vehicle power when re-charging the battery. Power contacts can also be used in lieu of inductive/wireless power transfer. Upon landing using a downward viewing camera, the UAV can shunt itself under the hooks and signal the vehicle to de-energize the locking pin solenoid.

A UAV's capabilities can include more than ride inspections. For example, after an accident, a UAV can examine the accident area, all vehicles affected, infrastructure affected, vehicle occupants and belongings, witnesses (take statements) and provide security until the proper authorities arrive. The UAV can also summon the proper authorities electronically. As such, the UAV can be used to prevent theft and accident tampering which may be helpful to an investigation. Recorded video can also serve as a basis for insurance adjustment.

In one aspect, a UAV is specifically used to inspect the interior of an autonomous vehicle between TaaS rides. Cameras on the UAV can supplement interior facing cameras mounted to the vehicle. The UAV can request the autonomous vehicle to lower a window (weather permitting), fly into spaces the interior facing cameras can't cover, exit the vehicle via the open window, and request the vehicle to raise the window.

The complexity of an inspection can be tailored to a specified service level and/or the battery capacity of a UAV. Higher end vehicle service can have more frequent and/or more detailed inspections. Lower end vehicle service can have less frequent and/or less detailed inspections.

Inspection frequency and detail can be extend using a variety of techniques. An inspection can include multiple flight/re-charge cycles per vehicle stop. A UAV can land underneath an autonomous vehicle and have the autonomous vehicle drive back and forth while the UAV remains stationary. A UAV can land beside an autonomous vehicle and have the autonomous vehicle drive back and forth while the UAV remains stationary. A UAV can take advantage of other landing places, such as, for example, walls, and have the autonomous vehicle drive back and forth while the UAV remains stationary. Cooperative flight control can be used to guide a UAV using sensors on the autonomous vehicle (e.g., cameras, LIDARs, ultrasonics, GPS, RADAR, etc.) rather than having the UAV carry the sensors.

A UAV can also perform diagnostics, alignment, and calibration on sensors (e.g., LIDAR, RADAR, camera, ultrasonics, etc.) of the autonomous vehicle. For example, the UAV can carry a metal object for radar, a reflective object or itself for LIDAR, itself for a camera, a visual pattern for calibration, etc.

A UAV can also perform remedial maintenance on an autonomous vehicle. For example, a UAV can carry a damp sponge. The UAV can use (e.g., spin) the damp sponge to clear sensor covers after inclement weather or to otherwise remove grime.

Aspects of the invention can be implemented in a variety of different types of computing devices. FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, radars, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
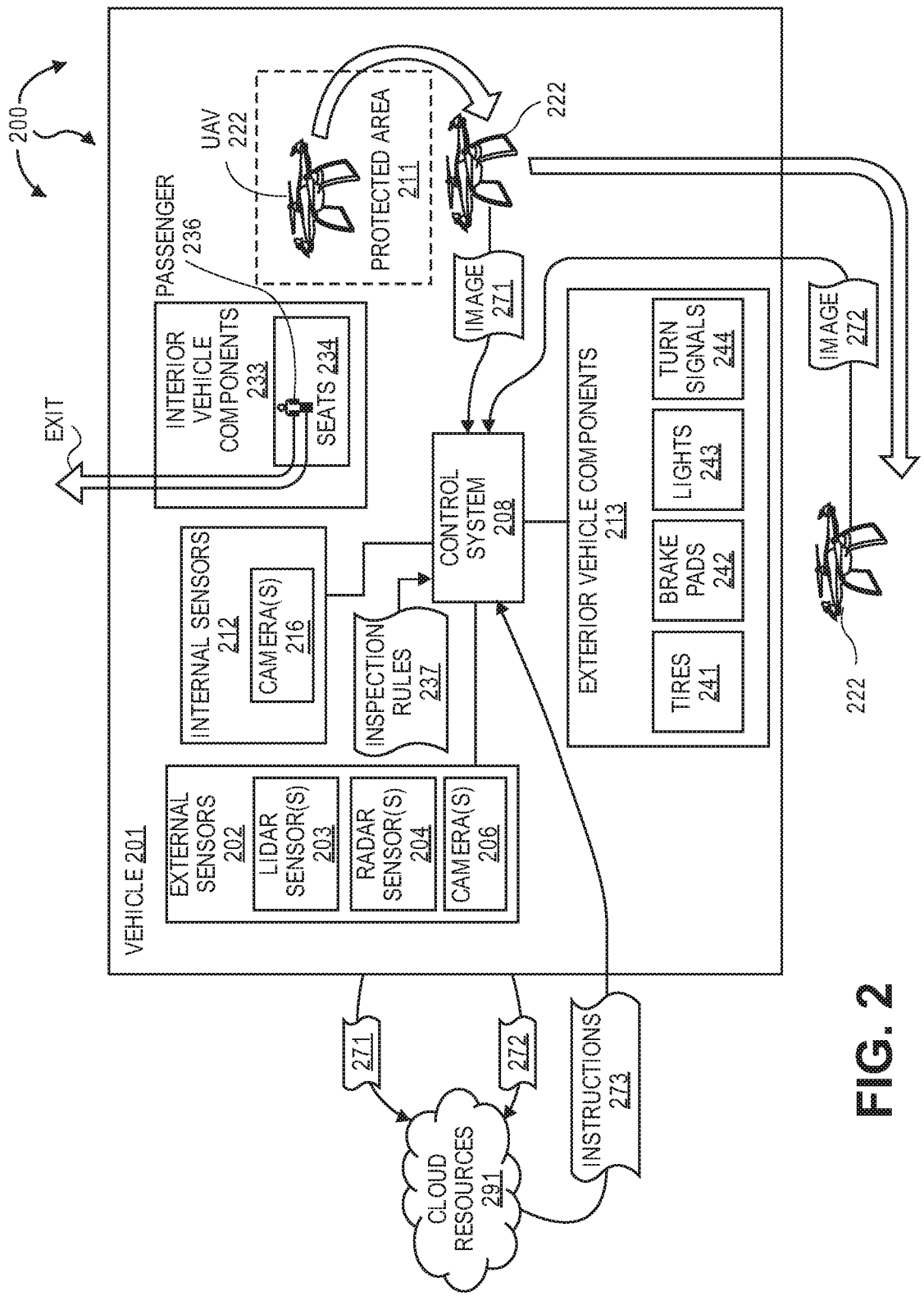
FIG. 2 illustrates an environment that facilitates using an Unmanned Aerial Vehicle (UAV) to inspect an autonomous vehicle.

FIG. 2 illustrates an environment 200 that facilitates using Unmanned Aerial Vehicles (UAVs) to inspect autonomous vehicles. Environment 200 includes vehicle 201, such as, for example, an autonomous car, truck, or bus. Vehicle 201 can contain one or more passengers, such as, for example, passenger 236. Vehicle 201 includes external sensors 202, internal sensors 212, control system 208, exterior vehicle components 213, and interior vehicle components 233. Vehicle 201 also includes protected area 211, such as, for example, a trunk, glove compartment, etc., for storing Undammed Aerial Vehicle (UAV) 222.

Control system 208 can include control components (processors, controllers, memory, storage, network connectivity, global positioning system, etc.) used to autonomously control vehicle 201.

External sensors 202 include one or more of: LIDAR sensor(s) 203, radar sensor(s) 204, and camera(s) 206. External sensors 202 may also include other types of sensors (not shown), such as, for example, acoustic sensors, ultrasonic sensors, and electromagnetic sensors. In general, external sensors 202 can sense and/or monitor objects in the proximity of vehicle 201. External sensors 202 can output sensor data indicating the position and/or optical flow (i.e., direction and speed) of monitored objects to control system 208.

Internal sensors 212 include camera(s) 216. Cameras 216 can be used view spaces inside vehicle 201, such as, for example, seating areas, passengers in the seating areas, etc. In general, internal sensors can sense and/or monitor objects inside vehicle 201. Internal sensors 212 can output sensor data indicating the position, condition, etc. of monitored objects to control system 208.

Exterior vehicle components 213 include components of vehicle 201, such as, for example, tires 241, brake pads 242, lights 243, turn signals 244, etc. For a car or truck, tires 241 can include four or more tires. Each tire can be attached to a wheel that turns the tire. Interior vehicle components 233 include seats 234. One or more passengers, such as, passenger 236 can ride in seats 234 when autonomous vehicle 201 is in motion. Vehicle components can also include any of a plurality of other components found in vehicles, such as, for example, doors, windows, an engine, a transmission, exhaust, a throttle, a battery (and other electrical system components), environmental control components, media system components, etc.

Based on sensor data, control system 208 can control exterior vehicle components 213 and interior vehicle components 233 to autonomously operate vehicle 201.

Protected area 211 can include a docking/re-charging station for UAV 222. When vehicle 201 is in motion, UAV 222 can be secured in protected area 211.

In one aspect, vehicle 201 is part of a Transportation as a Service (TaaS) fleet. Vehicle 201 can be used to provide autonomous fare-based rides for $3^{rd}$ parties. Between rides, UAV 222 can be released from protected area 211 to inspect the interior and/or inspect the exterior or vehicle 201.

Figure 3:
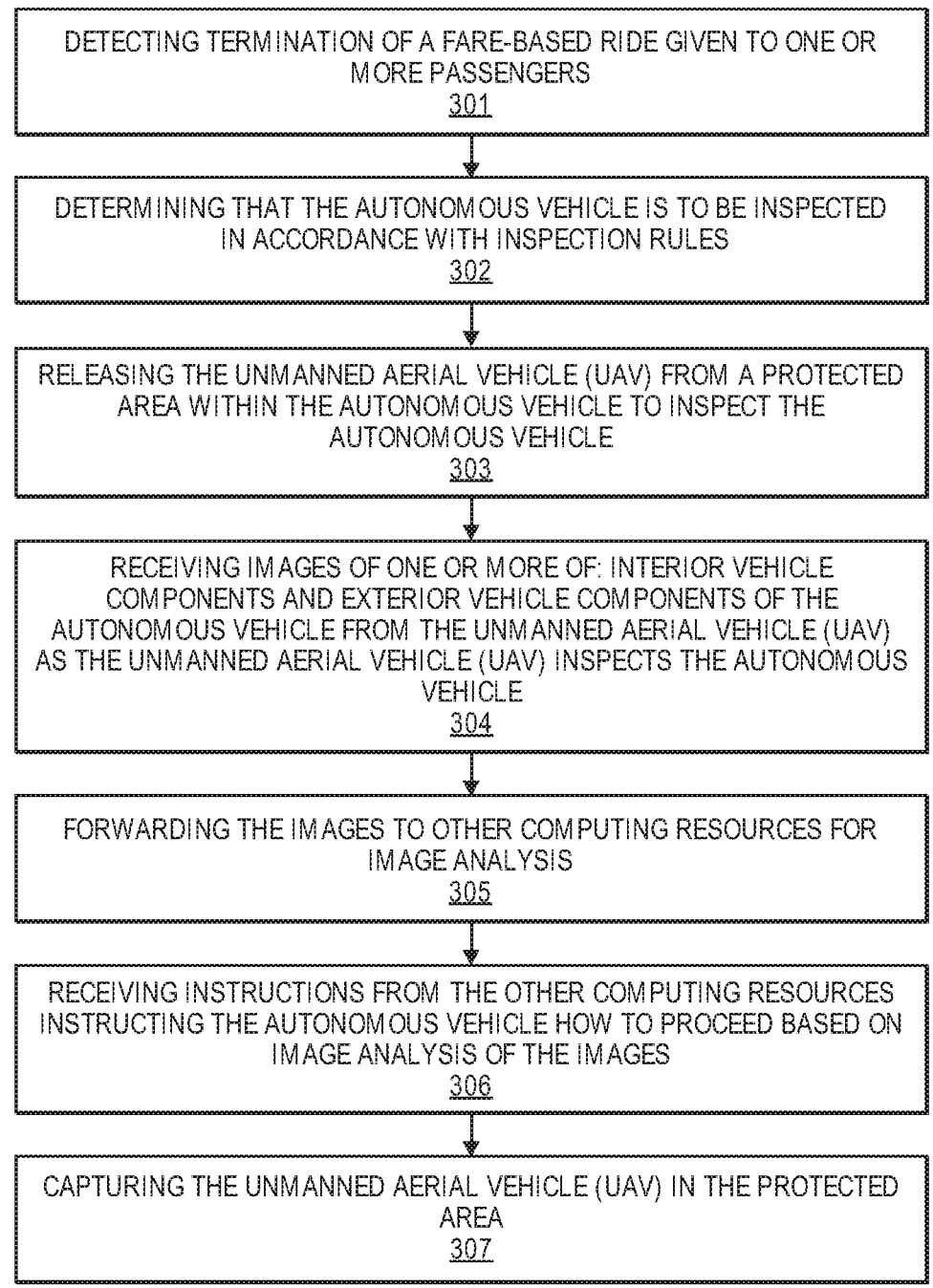
FIG. 3 illustrates a flow chart of an example method for using an Unmanned Aerial Vehicle (UAV) to inspect an autonomous vehicle.

FIG. 3 illustrates a flow chart of an example method 300 for using an Unmanned Aerial Vehicle (UAV) to inspect an autonomous vehicle. Method 300 will be described with respect to the components and data in environment 200.

Method 300 includes detecting termination of a fare-based ride given to one or more passengers (301). For example, control system 208 can detect that an indicated destination for a fare-based ride given to passenger 236 has been reached. Upon reaching the indicated destination, control system 208 considers the fare-based ride terminated. Passenger 236 can exit vehicle 201.

Method 300 includes determining that the autonomous vehicle is to be inspected in accordance with inspection rules (302). For example, control system 208 can determine that vehicle 201 is to be inspected in accordance with inspection rules 237. Inspection rules 237 can define when and how vehicle 201 is to be inspected. The frequency and/or detail of an inspection can vary based on a level of service being provided by vehicle 201. Higher end service can be associated with more frequent and/or detail inspections. On the other hand, lower end service can be associated with less frequent and/or less details inspections. The frequency and/or detail of an inspection can also be based on the battery life of UAV 222.

Method 300 includes releasing the Unmanned Aerial Vehicle (UAV) from a protected area within the autonomous vehicle to inspect the autonomous vehicle (303). For example, control system 208 can release UAV 222 from protected area 211 (e.g., a trunk or a glove compartment) to inspect vehicle 201. Releasing UAV 222 can include releasing one or more hooks and/or solenoid pins used for recharging UAV 222 (e.g., wireless power transfer (WPT)).

Method 300 includes receiving images of one or more of: interior vehicle components and exterior vehicle components of the autonomous vehicle from the Unmanned Aerial Vehicle (UAV) as the Unmanned Aerial Vehicle (UAV) inspects the autonomous vehicle (304). UAV 222 can fly in the interior of vehicle 201 and take images of interior vehicle components 233. For example, UAV 222 can take image 271 of seats 234. UAV 222 can send image 271 to control system 208. Control system 208 can receive image 271 from UAV 222. UAV 222 can also fly around the exterior of vehicle 201 and take images of exterior vehicle components 213. For example, UAV 222 can take image 272 of tires 241. UAV 222 can send image 272 to control system 208. Control system 208 can receive image 272 from UAV 222.

Images of other interior vehicle components 233 and exterior vehicle components 213 can also be sent from UAV 222 to control system 208. In one aspect, UAV 222 also takes one or more videos of interior vehicle components 233 and/or exterior vehicle components 213. The one more videos can also be sent from UAV 222 to control system 208.

Method 300 includes forwarding the images to other computing resources for image analysis (305). For example, control system 208 can forward images 271 and 272 (along with any other images and/or videos) to cloud resources 291 for image analysis. Images and/or videos can be forwarded via wireless communication.

In one aspect, cloud resources 291 include a neural network architected in accordance with a multi-layer (or "deep") model. A multi-layer neural network model can include an input layer, a plurality of hidden layers, and an output layer. A multi-layer neural network model may also include a loss layer. For image analysis, values in an image or video (e.g., pixel-values) are assigned to input nodes and then fed through the plurality of hidden layers of the neural network. The plurality of hidden layers can perform a number of non-linear transformations. At the end of the transformations, an output node yields an inference of potential maintenance issues (damaged tire tread or sidewalls, non-functional turn signals, body damage due to collision, etc.) for vehicle 201 based on an input image. Multiple different images and/or videos of different parts of vehicle 201 can be analyzed.

Based on the results of image analysis, cloud resources 291 can return instructions 273 to vehicle 201. Instructions 273 can be returned via wireless communication. If no potential maintenance issues are inferred (i.e., the vehicle 201 passes the inspection), instructions 273 can instruct vehicle 201 to pick-up passengers for another fare-based ride. On the other hand, if potential maintenance issues are inferred (i.e., the vehicle 201 fails the inspection), instructions 273 can instruct vehicle 201 to return to a return to a repair facility or electronically summon a tow vehicle.

Method 300 includes receiving instructions from the other computing resources instructing the autonomous vehicle how to proceed based on image analysis of the images (306). For example, control system 208 can receive instructions 273 from cloud resources 273. Vehicle 201 can then act in accordance with instructions 273. For example, vehicle 201 can autonomously proceed to a next pick-up location to pick-up one or more passengers for another fare-based ride. Alternately, vehicle 201 can being proceed autonomously to a repair location or can electronically summon a tow vehicle. In combination with proceeding to a repair location or electronically summoning a tow vehicle, vehicle 201 request a replacement vehicle.

In one aspect, instructions 273 instruct vehicle 201 to send additional images and/or videos of one or more vehicle components to cloud resources 291 for further analysis. In response, control system 208 instructs UAV 222 to obtain the additional images and/or videos. The UAV sends the additional images and/or videos to control system 208 which in turn forwards the additional images and/or videos to cloud resources 291 for analysis. Based on analysis of the additional images and/or videos, cloud resources 291 can formulate further instructions for vehicle 201.

Method 300 includes capturing the Unmanned Aerial Vehicle (UAV) in the protected area (307). For example, when an inspection flight path is completed and/or no additional images and/or videos are requested by cloud resources 291, UAV 222 can return to protected area 211. UAV 222 can be secured into a charging station in protected area 211 for recharging. UAV 222 can be secured with one or more hooks and/or solenoid pins for recharging (e.g., wireless power transfer (WPT)) via inductive charging.

Figure 4A:
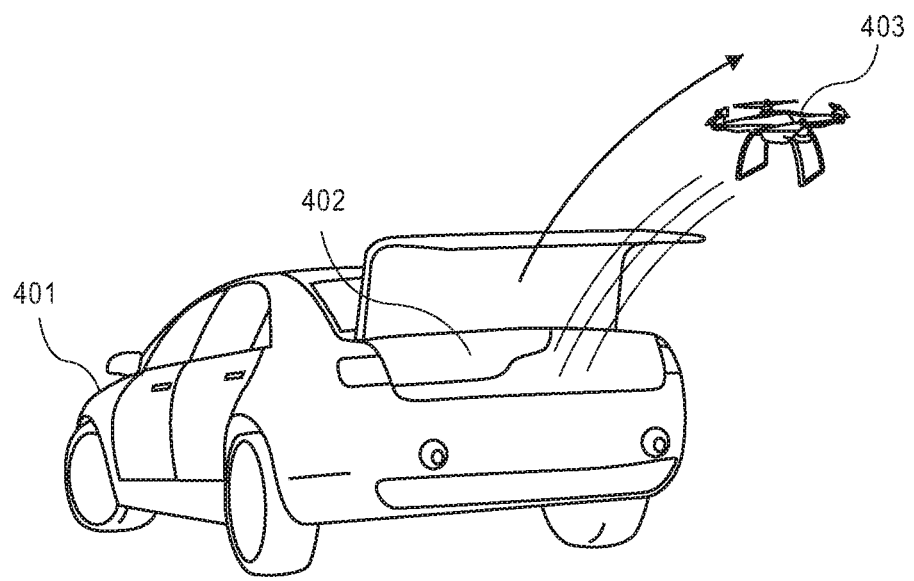
FIGS. 4A and 4B illustrate examples of an Unmanned Aerial Vehicle (UAV) being released from a protected area within an autonomous vehicle.
Figure 4B:
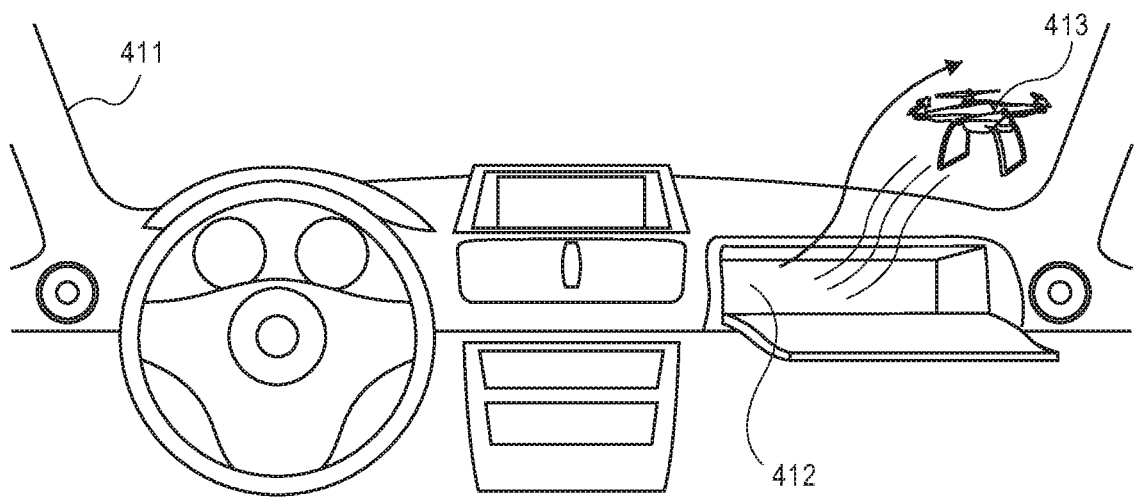

FIGS. 4A and 4B illustrates an example an Unmanned Aerial Vehicles (UAVs) being released from a protected area within an autonomous vehicle. In FIG. 4A, a UAV 403 is released from trunk 402 of autonomous car 401. After being released, UAV 403 can fly around autonomous car 401 capturing images of exterior components. Alternately, UAV 403 can land and autonomous car 401 can drive by or over UAV 403. UAV 403 can capture images of exterior components as car 401 drives by or over UAV 403. When image capture is complete, UAV 403 can return to trunk 402.

In FIG. 4B, a UAV 413 is released from glove compartment 412 of autonomous car 411. After being released, UAV 413 can fly within the interior of autonomous car 411 capturing images (e.g., for cleanliness or damage). UAV 413 can fly out of a window to capture images of exterior components of autonomous car 411. When image capture is complete, UAV 413 can return to glove compartment 412.

Figure 5:
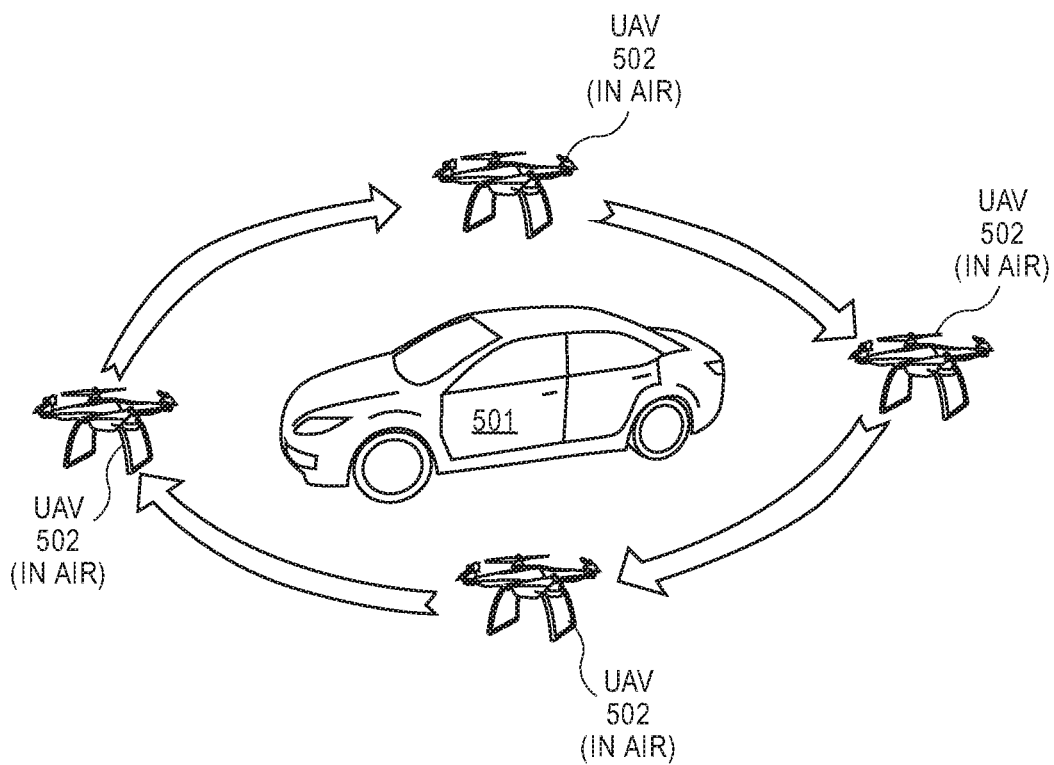
FIG. 5 illustrates an example of an Unmanned Aerial Vehicle (UAV) flying around an autonomous vehicle.

FIG. 5 illustrates an example of an Unmanned Aerial Vehicle (UAV) 502 flying around autonomous car 501. UAV 502 can fly between different positions (e.g., in accordance with a pre-programmed flight path) to capture images of external components of autonomous car 501.

Figure 6:
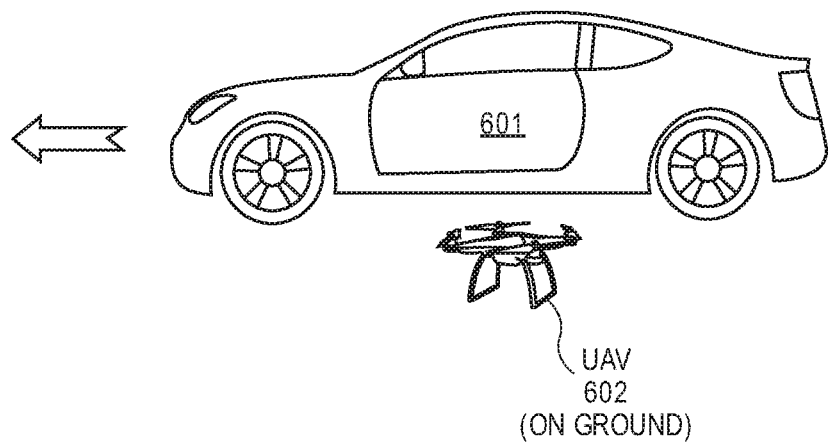
FIG. 6 illustrates an example of an autonomous vehicle driving by an Unmanned Aerial Vehicle (UAV).

FIG. 6 illustrates an example of an autonomous car 601 driving by Unmanned Aerial Vehicle (UAV) 602. UAV 602 can capture images of external components of autonomous car 601 as autonomous car 601 drives by UAV 602.

Figure 7:
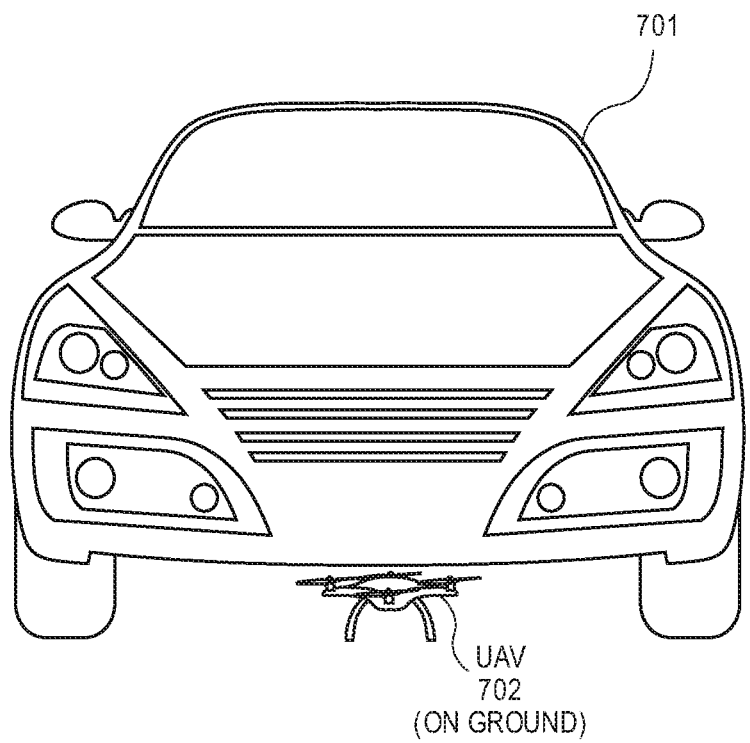
FIG. 7 illustrates an example of an autonomous vehicle driving over an Unmanned Aerial Vehicle (UAV).

FIG. 7 illustrates an example of an autonomous car 701 driving over Unmanned Aerial Vehicle (UAV) 702. UAV 702 can capture images of external components (e.g., the undercarriage) of autonomous car 701 as autonomous car 701 drives over UAV 702.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, images, videos, inspection rules, instructions, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, images, videos, inspection rules, instructions, etc.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

What is claimed:

1. A method, the method comprising:
   detecting termination of a fare-based ride given to one or more passengers;
   determining that an autonomous vehicle is to be inspected in accordance with inspection rules;
   releasing an Unmanned Aerial Vehicle (UAV) from a protected area within the autonomous vehicle to inspect the autonomous vehicle;
   receiving images of one or more of: interior vehicle components and exterior vehicle components of the autonomous vehicle from the Unmanned Aerial Vehicle (UAV) inspecting the autonomous vehicle;
   forwarding the images for image analysis; and
   receiving instructions instructing the autonomous vehicle how to proceed based on the image analysis of the images.

2. The method of claim 1, further comprising capturing the Unmanned Aerial Vehicle (UAV) in the protected area after the inspection is completed.

3. The method of claim 1, wherein receiving images from an Unmanned Aerial Vehicle (UAV) comprises receiving images from the Unmanned Aerial Vehicle (UAV) as the Unmanned Aerial Vehicle (UAV) flies around the autonomous vehicle.

4. The method of claim 1, wherein receiving images from an Unmanned Aerial Vehicle (UAV) comprises receiving images captured by the Unmanned Aerial Vehicle (UAV) as the autonomous vehicle drives by the Unmanned Aerial Vehicle (UAV).

5. The method of claim 1, wherein receiving images from an Unmanned Aerial Vehicle (UAV) comprises receiving images captured by the Unmanned Aerial Vehicle (UAV) as the autonomous vehicle drives over the Unmanned Aerial Vehicle (UAV).

6. An autonomous vehicle, the autonomous vehicle comprising:
   one or more processors;
   system memory coupled to one or more processors, the system memory storing instructions that are executable by the one or more processors;
   an Unmanned Aerial Vehicle (UAV) stored in a protected area within the autonomous vehicle; and
   the one or more processors configured to execute the instructions stored in the system memory to use the Unmanned Aerial Vehicle (UAV) to inspect the autonomous vehicle, including the following:
     detect termination of a fare-based ride given to one or more passengers;
     determine that the autonomous vehicle is to be inspected in accordance with inspection rules;
     release the Unmanned Aerial Vehicle (UAV) from the protected area to inspect the autonomous vehicle;
     receive images of one or more of: interior vehicle components and exterior vehicle components of the autonomous vehicle from the Unmanned Aerial Vehicle (UAV) as the Unmanned Aerial Vehicle (UAV) inspects the autonomous vehicle;
     forward the images to other computing resources for image analysis;
     receive instructions from the other computing resources instructing the autonomous vehicle how to proceed based on image analysis of the images; and
     capture the Unmanned Aerial Vehicle (UAV) in the protected area.

7. The autonomous vehicle of claim 6, further comprising a charging station in the protected area for wirelessly charging the Unmanned Aerial Vehicle (UAV), and wherein the one or more processors configured to execute the instructions stored in the system memory to capture the Unmanned Aerial Vehicle (UAV) in the protected area comprises the one or more processors configured to execute the instructions stored in the system memory to anchor the Unmanned Aerial Vehicle (UAV) to the charging station.

8. The autonomous vehicle of claim 6, wherein the one or more processors configured to execute the instructions stored in the system memory to determine that the autonomous vehicle is to be inspected in accordance with inspection rules comprises the one or more processors configured to execute the instructions stored in the system memory to determine that the autonomous vehicle is to be inspected based on a service level associated with the autonomous vehicle.

9. The autonomous vehicle of claim 6, wherein the one or more processors configured to execute the instructions stored in the system memory to receive images from the Unmanned Aerial Vehicle (UAV) comprises the one or more processors configured to execute the instructions stored in the system memory to receive images indicative of the cleanliness of the interior of the autonomous vehicle.

10. The autonomous vehicle of claim 6, wherein the one or more processors configured to execute the instructions stored in the system memory to receive images from the Unmanned Aerial Vehicle (UAV) comprises the one or more processors configured to execute the instructions stored in the system memory to receive images of one or more exterior components of the autonomous vehicle, the one or more exterior components selected from among: tires, brake pads, turning signals, and head lights.

11. The autonomous vehicle of claim 6, wherein the one or more processors configured to execute the instructions stored in the system memory to forward the images to other computing resources for image analysis comprises the one or more processors configured to execute the instructions stored in the system memory to forward the images to a neural network.

12. The autonomous vehicle of claim 6, wherein the one or more processors configured to execute the instructions stored in the system memory to receive instructions from the other computing resources comprises the one or more processors configured to execute the instructions stored in the system memory to receive instructions from a neural network.

13. The autonomous vehicle of claim 6, wherein the one or more processors configured to execute the instructions stored in the system memory to receive instructions from the other computing resources comprises the one or more processors configured to execute the instructions stored in the system memory to receive instructions instructing the autonomous vehicle to return to a repair facility.

14. The autonomous vehicle of claim 6, wherein the one or more processors configured to execute the instructions stored in the system memory to receive instructions from the other computing resources comprises the one or more processors configured to execute the instructions stored in the system memory to receive instructions instructing the autonomous vehicle to electronically request a tow vehicle.

15. The autonomous vehicle of claim 6, further comprising the one or more processors configured to execute the instructions stored in the system memory to instruct the Unmanned Aerial Vehicle (UAV) to perform a remedial maintenance operation on the autonomous vehicle.

16. A method for use at an autonomous vehicle, the method for using an Unmanned Aerial Vehicle (UAV) to inspect an autonomous vehicle, the method comprising:
  detecting termination of a fare-based ride given to one or more passengers;
  determining that the autonomous vehicle is to be inspected in accordance with inspection rules;
  releasing the Unmanned Aerial Vehicle (UAV) from a protected area within the autonomous vehicle to inspect the autonomous vehicle;
  receiving images of one or more of: interior vehicle components and exterior vehicle components of the autonomous vehicle from the Unmanned Aerial Vehicle (UAV) as the Unmanned Aerial Vehicle (UAV) inspects the autonomous vehicle;
  forwarding the images to other computing resources for image analysis;
  receiving instructions from the other computing resources instructing the autonomous vehicle how to proceed based on image analysis of the images; and
  capturing the Unmanned Aerial Vehicle (UAV) in the protected area.

17. The method of claim 16, wherein receiving images from an Unmanned Aerial Vehicle (UAV) comprises receiving images from the Unmanned Aerial Vehicle (UAV) as the Unmanned Aerial Vehicle (UAV) flies around the autonomous vehicle.

18. The method of claim 16, wherein receiving images from an Unmanned Aerial Vehicle (UAV) comprises receiving images captured by the Unmanned Aerial Vehicle (UAV) as the autonomous vehicle drives by the Unmanned Aerial Vehicle (UAV).

19. The method of claim 16 wherein receiving images from an Unmanned Aerial Vehicle (UAV) comprises receiving images captured by the Unmanned Aerial Vehicle (UAV) as the autonomous vehicle drives over the Unmanned Aerial Vehicle (UAV).

* * * * *